United States Patent [19]

Ueda

[11] Patent Number: 4,810,608

[45] Date of Patent: Mar. 7, 1989

[54] PHOTOSENSITIVE MEMBER HAVING AN AZO COMPOUND

[75] Inventor: Hideaki Ueda, Osaka, Japan

[73] Assignee: Minolta Camera Kabushiki Kaisha, Osaka, Japan

[21] Appl. No.: 154,203

[22] Filed: Feb. 10, 1988

[30] Foreign Application Priority Data

Feb. 12, 1987 [JP] Japan .................. 62-30482

[51] Int. Cl.$^4$ .................. G03G 5/06
[52] U.S. Cl. .................. 430/73; 430/76; 430/78
[58] Field of Search .................. 430/73, 72, 76, 78

[56] References Cited

U.S. PATENT DOCUMENTS

| | | | |
|---|---|---|---|
| 4,123,270 | 10/1978 | Heil et al. | 430/58 |
| 4,272,598 | 6/1981 | Sasaki et al. | 430/72 |
| 4,396,695 | 8/1983 | Dimmler et al. | 430/59 |
| 4,396,696 | 8/1983 | Nagasaka et al. | 430/78 |
| 4,533,613 | 8/1985 | Kawamura et al. | 430/78 |
| 4,537,847 | 8/1985 | Takahashi et al. | 430/58 |
| 4,540,651 | 9/1985 | Fujimaki et al. | 430/72 |
| 4,554,231 | 11/1985 | Ishikawa et al. | 430/59 |
| 4,631,242 | 12/1986 | Emoto et al. | 430/58 |
| 4,687,721 | 8/1987 | Emoto et al. | 430/58 |
| 4,702,982 | 10/1987 | Matsumoto et al. | 430/72 |

FOREIGN PATENT DOCUMENTS 55-117151 9/1980 Japan .

*Primary Examiner*—John L. Goodrow
*Attorney, Agent, or Firm*—Burns, Doane, Swecker & Mathis

[57] ABSTRACT

The present invention relates to a photo sensitive member containing a specific azo compound for a charge generating agent, which is improved in photosensitive properties, in particular, sensitivity.

7 Claims, No Drawings

PHOTOSENSITIVE MEMBER HAVING AN AZO COMPOUND

BACKGROUND OF THE INVENTION

This invention relates to a photosensitive member containing a new azo dye.

Known photosensitive materials for forming a photosensitive member include inorganic photoconductive materials such as selenium, cadmium sulfide or zinc oxide.

These photosensitive materials have many advantages such as low loss of charges in the dark, an electrical charge which can be rapidly dissipated with irradiation of light and the like. However, they have disadvantages. For example, a photosensitive member based on selenium is difficult to produce, has high production costs and is difficult to handle due to inadequate resistivity to heat or mechanical impact. A photosensitive member based on cadmium sulfide or zinc oxide has defects such as its unstable sensitivity in a highly humid environment and loss of stability with time because of the deterioration of dyestuffs, added as a sensitizer, by corona charge and fading with exposure.

Many kinds of organic photoconductive materials such as polyvinylcarbazole and so on have been proposed. These organic photoconductive materials have superior film forming properties, are light in weight, etc., but inferior in sensitivity, durability and environmental compared to the aforementioned inorganic photoconductive materials.

Various studies and developments have been in progress to overcome the above noted defects and problems. A function-divided photosensitive member of a laminated or a dispersed type has been proposed, in which charge generating function and charge transporting function are divided by different layers or different dispersed materials. The function-divided photosensitive member can be a highly efficient photosensitive member in electrophotographic properties such as chargeability, sensitivity, residual potential, durability with respect to copy and repetition, because most adequate materials can be selected from various materials. Further, function-divided photosensitive member have high productivity and low costs, since they can be prepared by coating, and suitably selected charge generating materials can freely control a region of photosensitive wavelength. Illustrative examples of such charge generating materials are organic pigments or dyes such as phthalocyanine pigment, cyanine pigment, polycyclic quinone pigment, perylene pigment, Perinone pigment, indigo dye, thioindigo dye, squarain compounds, etc., and inorganic materials such as selenium, selenium-arsenic, selenium-tellurium, cadmium sulfide, zinc oxide, amorphous silicon, etc.

However, such photosensitive members, that which satisfy general static property requirements are not be produced easily, and more improved sensitivity is desired.

SUMMARY OF THE INVENTION

The object of the invention is to provide a photosensitive member having excellent general static properties, in particular, sensitivity.

The present invention relates to a photosensitive member wherein a photosensitive layer containing an azo pigment represented by the general formula (I) is formed on an electroconductive substrate;

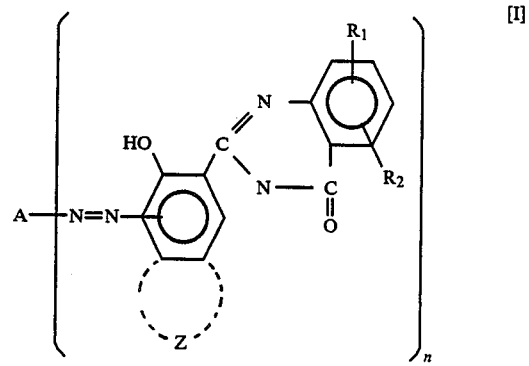

wherein A represents an aromatic hydrocarbon group or a heterocyclic group, which may be bonded through a bonding group; Z represents a residue forming a condensed polycyclic group or condensed heterocyclic group with a benzene ring and Z may have a substituent; $R_1$ and $R_2$ independently represent any of hydrogen, halogen atom, an alkyl group, an alkoxyl group, a nitro group, a substituted sulfon group, a carbamoyl which may have a substituent on the nitrogen atom, sulfamoyl group, or a C-acylamino group, or a phthalimidyl group, any of which may have a substituent; $R_1$, $R_2$ may combinedly form a cyclic ring; and n represents an integer of 1–4.

DETAILED DESCRIPTION OF THE INVENTION

The present invention provides a photosensitive member excellent having electrophotographic properties, in particular, sensitivity.

The present invention has accomplished the above object by the introduction into a photosensitive member of a specific azo pigment as a charge generating material.

A photosensitive member provided according to the present invention contains a specific azo compound represented by the following formula (I)

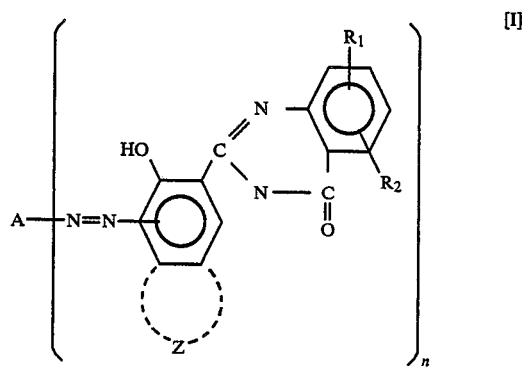

wherein A represents an aromatic hydrocarbon group or a heterocyclic group, which may be bonded through a bonding group; Z represents a residue forming a condensed polycyclic group or condensed heterocyclic group with a benzene ring and Z may have a substituent; $R_1$ and $R_2$ independently represent any of hydrogen, halogen atom, an alkyl group, an alkoxyl group, a nitro group, a substituted sulfon group, a carbamoyl group which may have a substituent on the nitrogen atom, sulfamoyl group, or a C-acylamino group, or a phthalimidyl group, any of which may have a substituent; $R_1$, $R_2$ may combinedly form a cyclic ring; and n represents an integer of 1-4.

A compound of the invention represented by the general formula (I) can be synthesized according to a known method. For example a N-amino compound represented by the general formula (II)

   [II]

wherein A and n are the same as above may be reacted with sodium nitrite in hydrochloric acid to give an azo compound, which may be coupled with an appropriate coupler represented by the following general formula (III) in the presence of alkali. In a further method, the azo compound may be prepared by altering an N-amino compound to an azo compound, isolating it by an addition with an acid such as $HBF_4$, and then subjectng it to a coupling reaction.

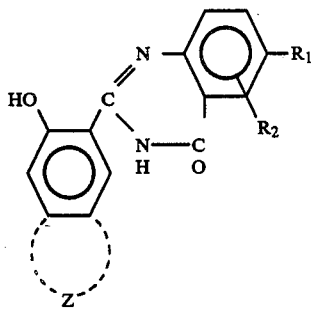   [III]

wherein Z, $R_1$, $R_2$ are the same as above.

A coupler component represented by the general formula (III) can be synthesized according to an usual methods. That is, the coupler component may be prepared by reacting a halogenide compound of carboxylic acid represented by the general formula (IV),

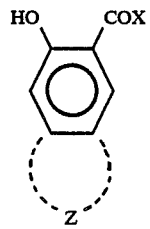   [IV]

wherein Z is the same as above and X is a halogen atom. with anthranilic acid amide represented by the general formula (V)

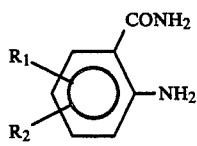   [V]

wherein $R_1$ and $R_2$ are the same as in (I) respectively; or by condensing a carboxylic acid amide represented by the general formula (VI)

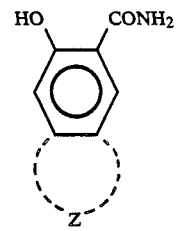   [VI]

wherein Z is the same as in (I)
with an isatoic acid anhydride represented by the general formula (VII)

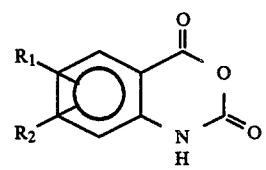   [VII]

wherein $R_1$, $R_2$ is the same as in (I).

A preferred coupler component of the invention represented by the general formula (III) is shown below, but with no significance of restricting the embodiments in the invention.

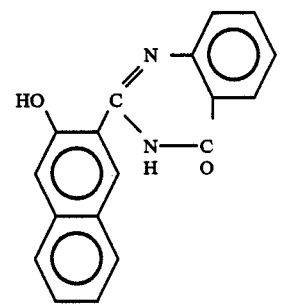   1.

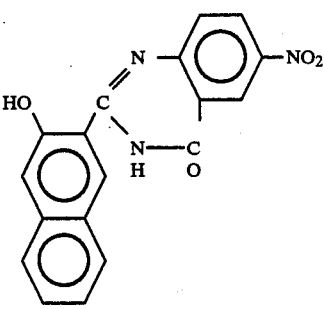   2.

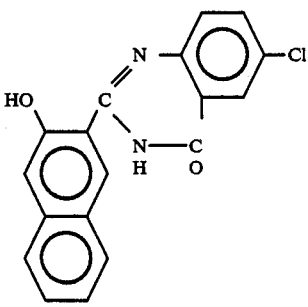   3.

4. 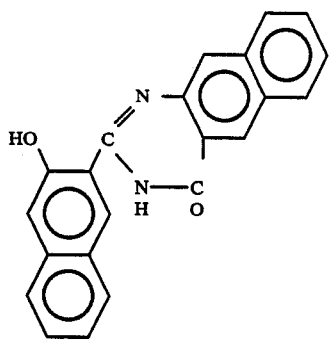
5. 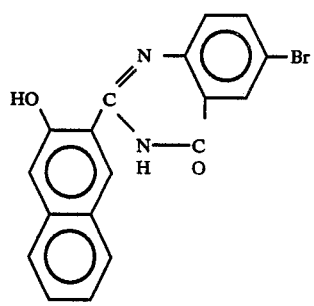
6. 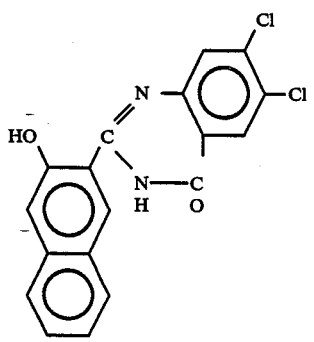
7. 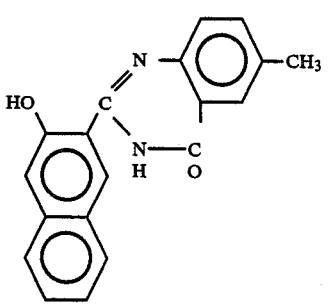
8. 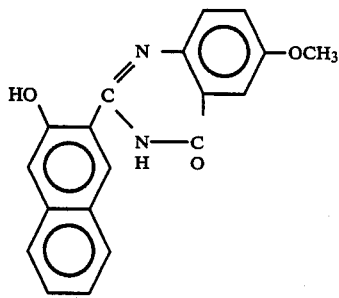
9. 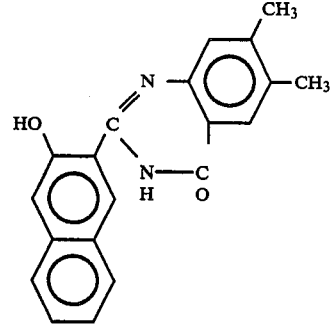
10. 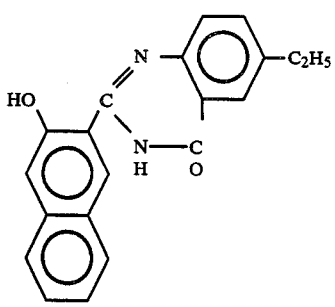
11. 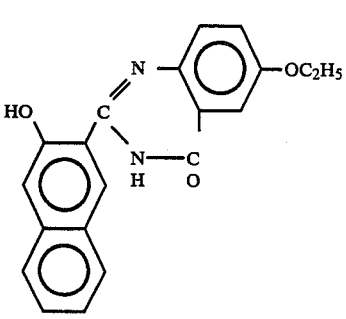
12. 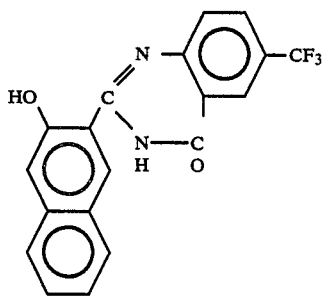
13. 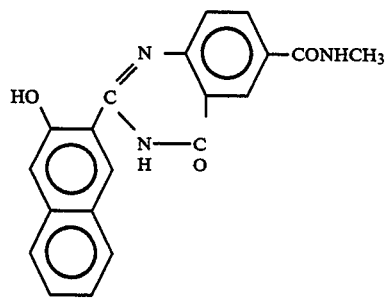

-continued
14.
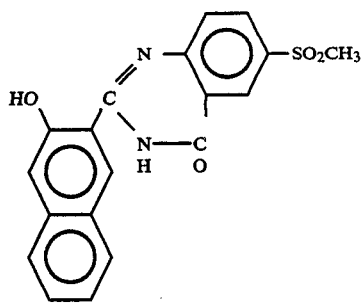
15.
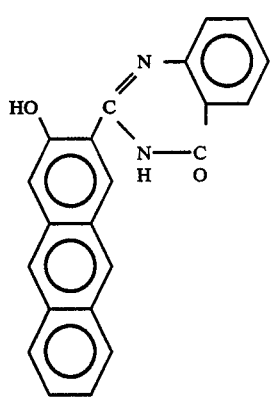
16.
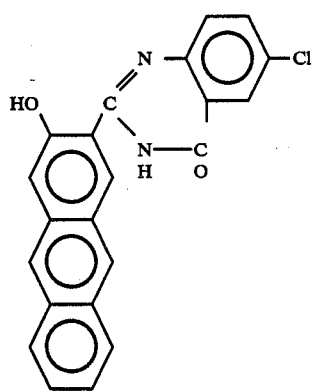
17.
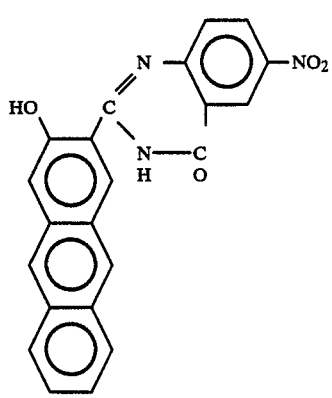
-continued
18.
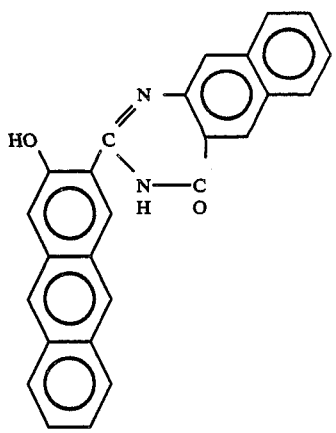
19.
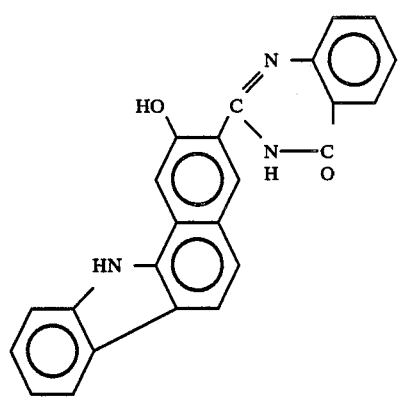
20.
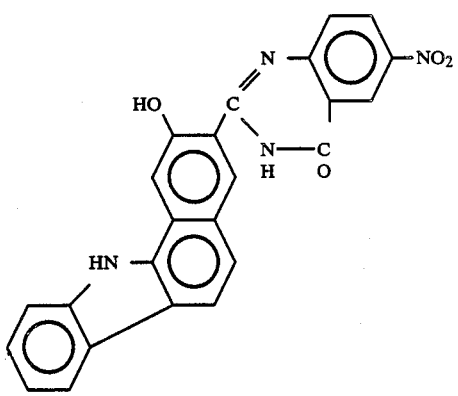
21.
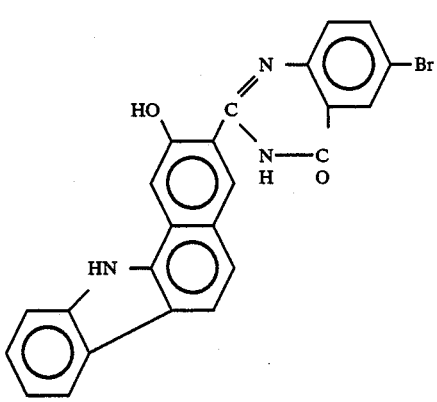

22.
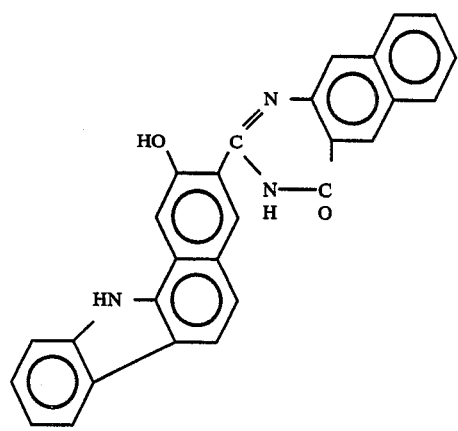
23.
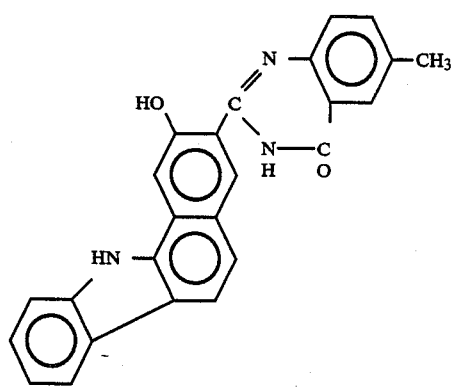
24.
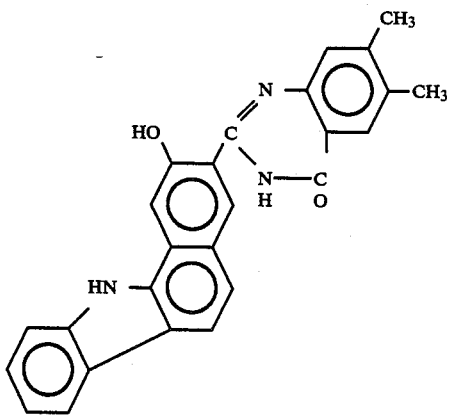
25.
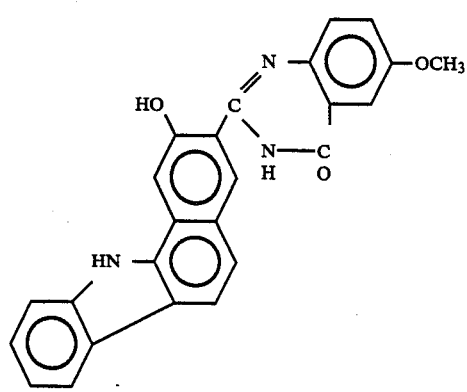
26.
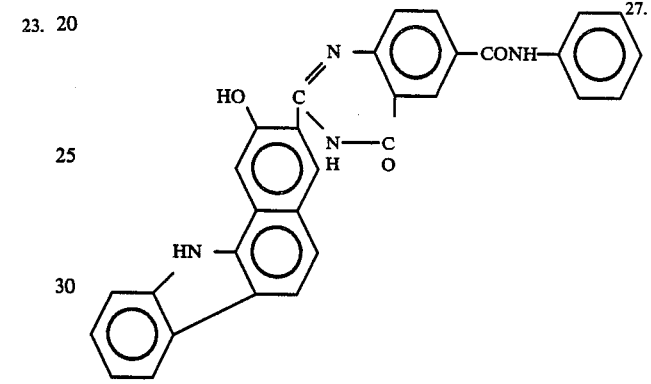
27.
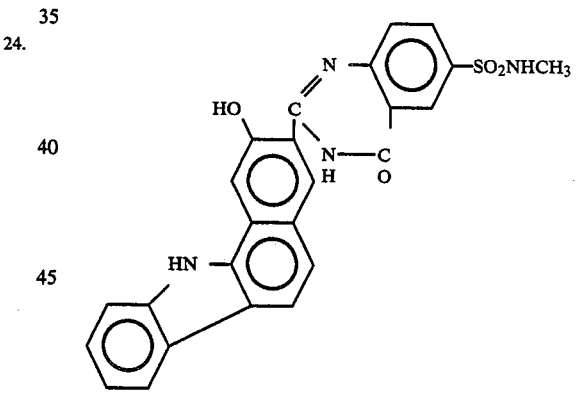
28.
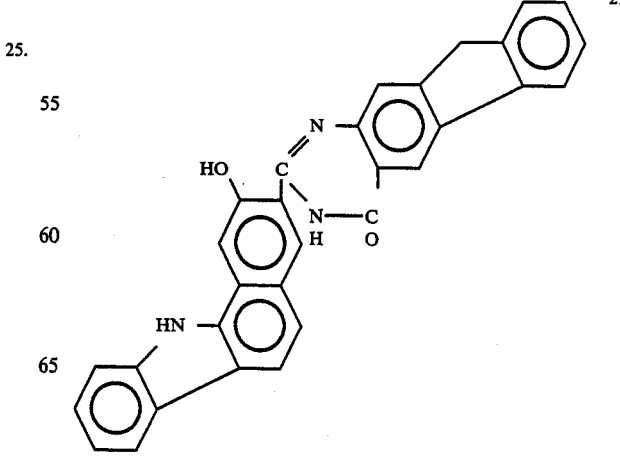
29.

30. 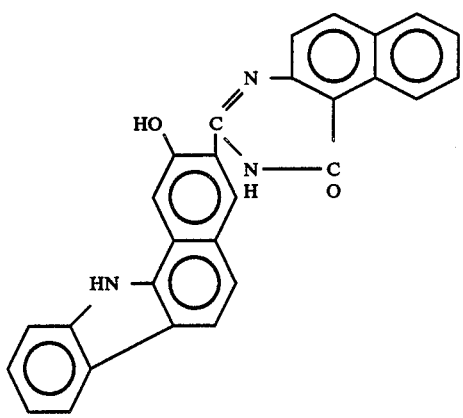

Preferred couplers above are, in particular, shown by (1), (2), (3), (4), (7), (8), (15), (19) and (20).

A method of production of a photosensitive member comprising an azo pigment represented by the general formula (I) with the above coupler component (1) is shown below, and other azo pigments with the other coupler components can be synthesized similarly according to the method of synthesis as below.

EXAMPLE OF SYNTHESIS 1

3,3′-Dichlorobenzidine (2.53 g, 0.01 mole) was dispersed in hydrochloric acid (100 ml). The dispersion was stirred and cooled to 5° C., followed by the addition of an aqueous solution of sodium nitrite (1.4 g) in water (20 ml). Further, the mixture stirred is cooled for one hour, and then filtered. Borofluoric acid (10 g) was added to the filtrate, and then crystallized. The obtained crystals were filtered to give 3,3′-dichlorobenzidine tetrafluoroborate.

Then, the resultant diazonium salt (3.49 g, 0.01 mole) and the coupling agent (5.76 g) represented by the above coupling component (1) were dissolved in N-methylpyrrolidone (330 ml), to which a solution of sodium acetate (5 g) dissolved in water (100 ml) was added at 10°–20° C. for about 30 minutes. After addition, the solution was further stirred at room temperature for 3.5 hours to filtrate deposited crystals.

The resultant crystals were dispersed in DMF (1 l), and the solution was stirred at room temperature for 3.5 hours, followed by filtration of the crystals. This operation was repeated two more times. Then, the crystals were washed with water and dried to give 7.1 g (83.4% of yield) of disazo pigment. Black-violet crystals.

| element | elemental analysis | | |
|---|---|---|---|
| | C | H | N |
| found | 67.73 | 3.21 | 13.05 |
| calcd. | 67.69 | 3.29 | 13.26 |

Components of A in the general formula (I) of the invention are shown below with no significance of restricting the embodiments.

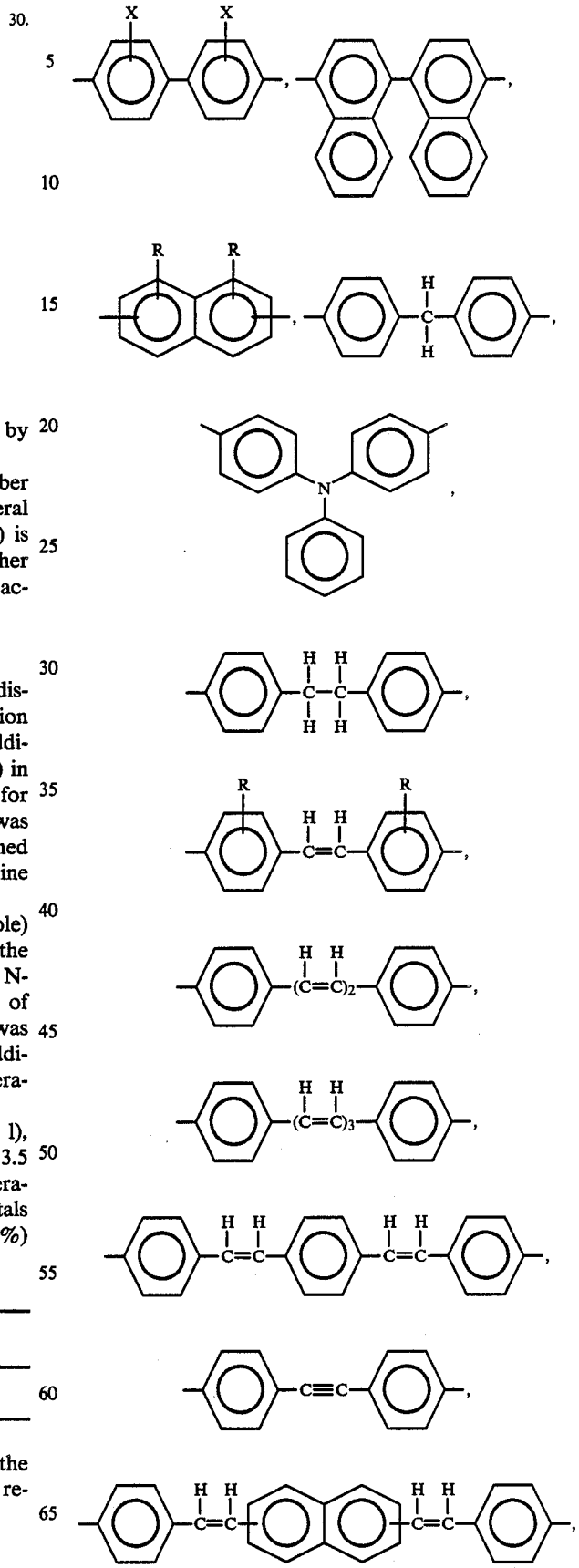

-continued
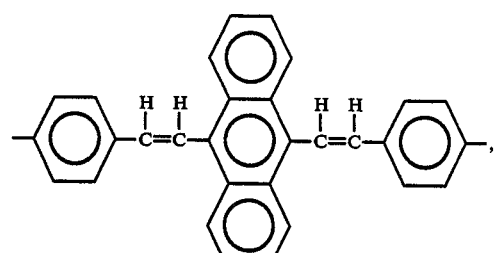
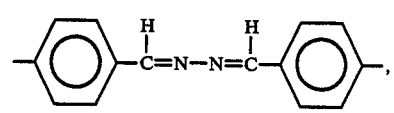
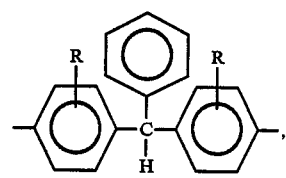
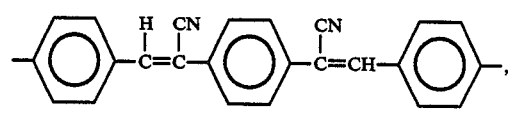
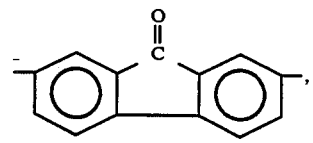
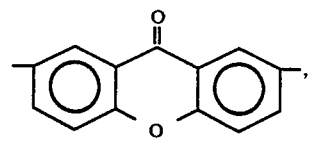
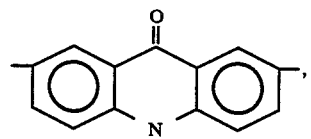
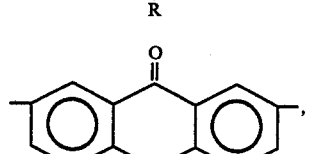
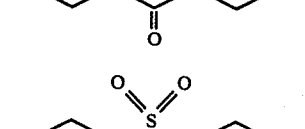
-continued
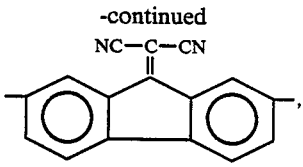
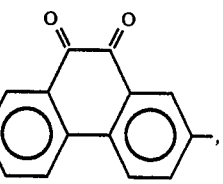
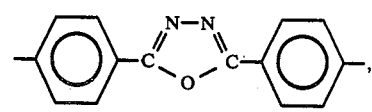
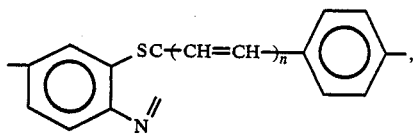
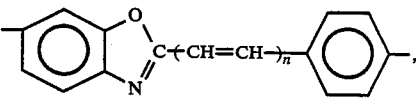
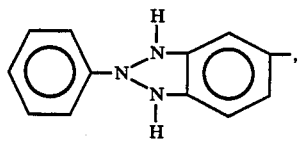
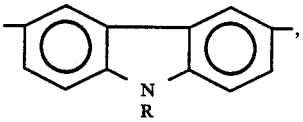
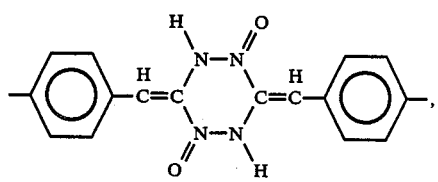
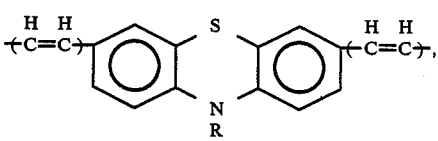
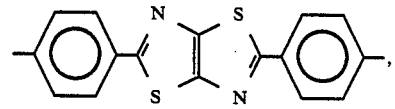
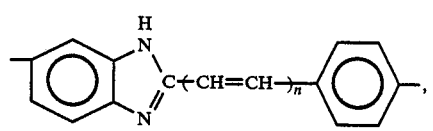

-continued

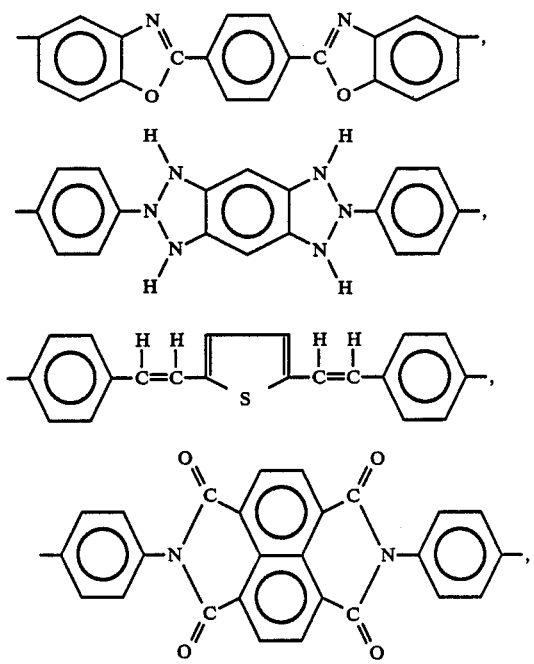

wherein X represents a hologen atom, halogen, an alkyl group or an alkoxyl group, and n is a integer of 0 or 1.

A photosensitive member of the invention has a photosensitive layer comprising one or more azo pigments represented by the aforementioned general formula (I). A photosensitive member, various types of which are known, may be any type in the invention. For example, a photosensitivemember of the invention may be a monolayer type in which a photosensitive layer is formed on a substrate by dispersing azo pigments in a resin binder or a charge transporting medium, or a laminated type in which first a charge generating layer containing mainly an azo pigment is formed on a substrate and then a charge transporting layer is formed on the charge generating layer. An azo pigment of the invention functions as a photoconductive material and generates charges with very high efficiency by absorbing light. The generated charges may be transported with an azo pigment as a medium, but more effectively with a charge transporting material as a medium.

In order to form a photosensitive member of a monolayer type, fine particles of azo pigments are dispersed in a resin solution or a solution containing a charge transporting compound and resin, which is spray dried on an electrically conductive substrate. The thickness of the photosensitive layer is 3-30 μm, preferably 5-20 μm. The sensitivity is poor if the azo pigment is used in an insufficient quantity, whereas the chargeability is poor and the mechanical strength of photosensitive layer is inadequate if used to excess. The amount of an azo pigment is within the range of 0.01-2 parts by weight, preferably, 0.2-1.2 parts by weight on the basis of one part by weight of resin. If a charge transporting material such as polyvinylcarbazole, which is capable of being used as a binder itself is used, an addition 21 amount of an azo pigment is preferably 0.01-0.5 parts by weight on the basis of one part by weight of charge transporting materials.

In order to form a photosensitive member of a laminated type, an azo pigment is deposited in a vacuum on a substrate, an azo pigment is dissolved in an amine solvent to apply onto a substrate or an application solution containing an pigment and, if necessary, binder resin dissolved in an appropriate solvent is applied onto a substrate to be dried.

Then, a solution containing a charge transporting material and a binder is applied onto the charge generating layer. The thickness of the azo pigment-containing layer as a charge generating layer is 4 μm or less, preferably, 2 μm or less. It is suitable that the charge-transporting layer has a thickness in the range 3-30 μm, preferably 5-20 μm, and the proportion of charge transporting materials in the charge-transporting layer is 0.2-2 parts by weight, preferably 0.3-1.3 parts by weight on the basis of one part by weight of the binder. There is no need to use a binder when the charge-transporting material is of a high-polymer which is capable of serving as a binder itself.

A photosensitive member of the present invention permits, in combination with the binder, the use of a plasticizer, such as halogenated paraffin, polybiphenyl chloride, dimethyl naphthalene, dibutyl phthalate or O-terphenyl, the use of an electron-attractive sensitizer, such as chloranyl, tetracyanoethylene, 2,4,7-trinitrofluorenone, 5,6-dicyanobenzoquinone, tetracyanoquinodimethane, tetrachlorphthalic anhydride, or 3,5-dinitrobenzoic acid, and the use of a sensitizer, such as methyl violet, rhodamine B, cyanine dye, pyrylium salt, and thiapyrylium salt. Applicable as a binder in the practice of this invention are any of the thermoplastic resins and thermosetting resins which are publicly known to be electrically insulative and any of the photocuring resins and photoconductive resins.

Some examples of suitable binders are thermoplastic resins such as saturated polyester, polyamide, acrylic, ethylene-vinyl acetate copolymer, ion cross-linked olefin copolymer (ionomer), styrene-butadiene block copolymer, polycarbonate, vinyl chloride-vinyl acetate copolymer, cellulose ester, polyimide, styrol, etc., and thermosetting resins such as, epoxy, urethane, silicone, phenolic, melamine, xylene, alkyd, thermosetting acrylic, etc., and photocuring resins, and photoconductive resins such as poly-N-vinyl carbazole, polyvinyl pyrene, polyvinyl anthracene, etc., all named without any significance of restricting the use to them. Any of these resins can be used singly or in combination with other resins. It is desirale for any of these electrically insulative resins to have a volume resistance of $1 \times 10^{12}$ Ω.cm or more when measured singly.

Illustrative examples of charge transporting materials are hydrazone compounds, pyrazoline compounds, styryl compoundsp, triphenylmethane compounds, oxadiazol compounds, carbazole compounds, stilbene compounds, enamine compounds, oxazole compoundsl, triphenylamine compounds, tetraphenylbenzidine, azine compounds and so on, including carbazole, N-ethylcarbazole, N-vinylcarbazole, N-phenylcarbazole, tethracene, chrysene, pyrene, perylene, 2-phenylnaphthalene, azapyrene, 2,3-benzochrysene, 3,4-benzopyrene, fluorene, 1,2-benzofluorene, 4-(2-fluorenylazo)-resorcinol, 2-p-anisolaminofluorene, p-diethylaminoazobenzene, cadion, N,N-dimethyl-p-phenylazoaniline, p-(dimethylamino)stilbene, 1,4-bis(2-methylstyryl)benzene, 9-(4-diethylaminostyrylanthracene, 2,5-bis(4-diethylaminophenyl)-1,3,5-oxadiazole, 1-phenyl-3-(p-diethylaminostyryl)-5-(p-diethylaminophenyl)pylazoline, 1-phenyl-3-phenyl-5-pylazolone, 2-(m-naphtyl)-3-phenyloxazole, 2-(p-diethylaminostyryl)-6-diethylaminobenzoxazole, 2-(p-diethylaminostyryl)-6-diethylaminobenzothiazole, bis(4-diethylamino-2-methylphenyl)phenylmethane, 1,1-bis(4-N,N-diethylamino-2-ethylphenyl)heptane, N,N-diphenylhydrazino-3-methylidene-10-ethylphenoxazine, N,N-diphenylhydrazino-3-methylidene-10-ethylphenothiazine, 1,1,2,2-tetrakis-(4-N,N-diethylamino-2-ethylphenyl)ethane, p-diethylaminobenzaldehyde-N,N-diphenylhydrazone, p-diphenylaminobenzaldehyde-N,N-diphenylhydrazone, N-ethylcarbazole-N-methyl-N-phenylhydrazone, p-diethylaminobenzaldehyde-N-α-naphthyl-N-phenylhydrazone, p-diethylaminobenzaldehyde-3-methylbenzothiazolinone-2-hydrazone, 2-methyl-4-N,N-diphenylamino-β-phenylstilbene, α-phenyl-4-N,N-diphenylaminostilbene and the like. Any of these resins can be used singly or in combination with other resins.

A photosensitive member thus formed may have an adhesion layer or a barrier layer between a substrate and a photosensitive layer. Examples of suitable material contained in these layers are polyimide, polyamide, nitrocellulose, polyvinyl butyral, polyvinyl alcohol, aluminium oxide and the like. It is preferable that the thickness of the layer is 1 μm or less.

An azo compound of the invention is effective, in particular, as a charge generating material used in a laminated-type photosensitive member. Specific examples are shown below.

EXAMPLE 1

The azo compound of 0.45 parts by weight of the invention wherein A was

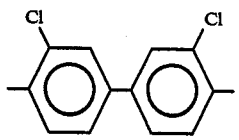

and the coupler was (1) component in the general formula (I), 0.45 part by weight of polyester resin (Vylon 200 made by TOYOBO) and 50 parts by weight of cyclohexanone were taken in Sand grinder for dispersion. The dispersion solution of the bisazo pigment was dispersed onto aluminotype-Mylar of 100 μm in thickness by a film applicator to form a charge generating layer so that a thickness of the dried layer will be 0.3 g/m². A solution of 70 parts of p-diphenylaminobenzaldehyde-N,N-diphenylhydrazone and 70 parts of polycarbonate resin (K-1300; made by TEIJIN KASEI) dissolved in 400 parts of dioxane was dispersed onto the above formed charge generating layer to form a charge transporting layer so that the thickness of the dried layer will be 16 μm. Thus, a photosensitive member with two layers was prepared.

An exposure value for half-reducing ($E_{1/2}$) obtained is in Table 1. The exposure value for half reducing, which is the exposure amount required for the surface potential to be half the value of the initial surface potential, is measured by first charging a photosensitive member by means of a corona-discharge of −6.5 KV in the dark and then exposing the member to white light of 5 lux in illuminance.

EXAMPLES 2-4

Photosensitive members were prepared in a manner similar to EXAMPLE 1, except that the coupler components (2), (3), and (15) were used.

EXAMPLES 5-8

Photosensitive members were prepared in a manner similar EXAMPLE 1, except that azo components, wherein A was

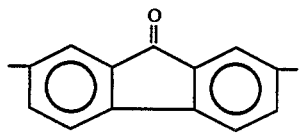

and the coupler components were (2), (3), (18) and (20) in the general formula (I), were used.

The results are shown in Table 1.

TABLE 1

| example | A | coupler | $E_{1/2}$ (lux · sec) |
|---|---|---|---|
| 1 | Cl-⟨⟩-⟨⟩-Cl | 1 | 3.9 |
| 2 | Cl-⟨⟩-⟨⟩-Cl | 2 | 2.6 |
| 3 | Cl-⟨⟩-⟨⟩-Cl | 3 | 2.8 |
| 4 | Cl-⟨⟩-⟨⟩-Cl | 15 | 3.5 |
| 5 | fluorenone | 2 | 2.6 |
| 6 | fluorenone | 3 | 2.1 |
| 7 | fluorenone | 18 | 2.3 |

TABLE 1-continued

| example | A | coupler | E½ (lux·sec) |
|---|---|---|---|
| 8 | (fluorenone structure) | 20 | 1.7 |

EXAMPLES 9–12

Photosensitive members were prepared in a manner similar to EXAMPLE 1 except that α-phenyl-4-N,N-diphenylaminostilbene was used as a charge transporting material azo components wherein A was:

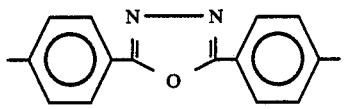

and the coupler components were (1), (17), (19) and (20) in the general formula (I), were used.

The results are shown in Table 2

EXAMPLES 13–16

Photosensitive members were prepared in a manner similar to EXAMPLE 1 except that azo components, wherein a was:

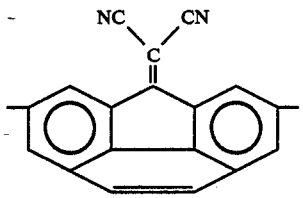

and the coupler components were (1), (3), (15) and (19) in the general formula (I), were used.

The results are shown in the Table 2.

TABLE 2

| example | A | coupler | E½ (lux·sec) |
|---|---|---|---|
| 9 | (N=N, O bridge diaryl) | 1 | 3.0 |
| 10 | (N=N, O bridge diaryl) | 17 | 2.3 |
| 11 | (N=N, O bridge diaryl) | 19 | 2.5 |
| 12 | (N=N, O bridge diaryl) | 20 | 2.1 |
| 13 | (dicyanomethylene fluorene) | 1 | 2.8 |
| 14 | (dicyanomethylene fluorene) | 3 | 2.4 |
| 15 | (dicyanomethylene fluorene) | 15 | 2.1 |
| 16 | (dicyanomethylene fluorene) | 19 | 1.7 |

EXAMPLES 17–22

Photosensitive members were prepared in a manner similar to EXAMPLE 1 except that:

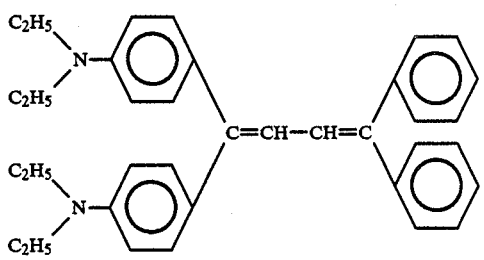

was used as a charge transporting material instead of p-diphenylaminobenzaldehyde-N,N-diphenylhydrazone and azo components, wherein A was

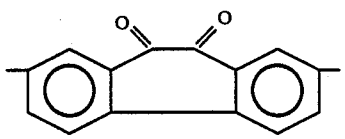

and the coupler components were (1), (3), (7), (8), (19) and (20) in the general formula (I) were used.

The results are shown in Table 3.

TABLE 3

| example | A | coupler | $E_{\frac{1}{2}}$ (lux.sec) |
|---|---|---|---|
| 17 | (dione structure) | 1 | 2.4 |
| 18 | (dione structure) | 3 | 1.9 |
| 19 | (dione structure) | 7 | 2.5 |
| 20 | (dione structure) | 8 | 2.3 |
| 21 | (dione structure) | 19 | 1.7 |
| 22 | (dione structure) | 20 | 1.5 |

EXAMPLES 23–25

Photosensitive members were prepared in a manner similar to EXAMPLE 1 except that azo components, wherein A was:

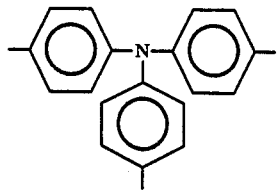

and the coupler components were (19), (23) and (25) in the general formula (I), were used, and

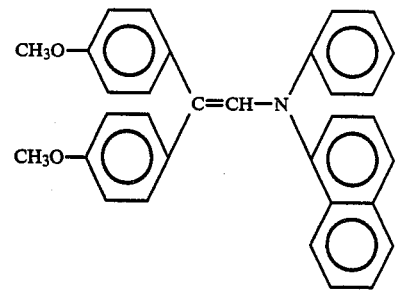

was used as a charge transporting material. The results are shown in Table 4.

TABLE 4

| example | A | coupler | $E_{\frac{1}{2}}$ (lux.sec) |
|---|---|---|---|
| 23 | (triarylamine) | 19 | 1.8 |
| 24 | (triarylamine) | 23 | 1.5 |
| 25 | (triarylamine) | 25 | 1.6 |

What is claimed is:
1. A photosensitive member with a photosensitive layer comprising an azo compound represented by the following formula (I) on a substrate;

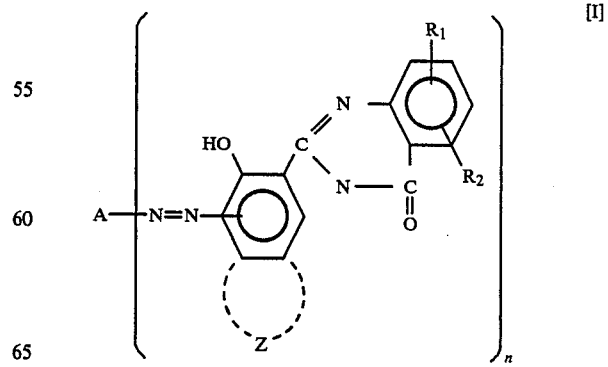

[I]

wherein A represents an aromatic hydrocarbon group or a heterocyclic group, which may be bonded through a bonding group; Z represents a residue forming a condensed polycyclic group or condensed heterocyclic group with a benzene ring and Z may have a substituent; $R_1$ and $R_2$ independently represent any of hydrogen, halogen atom, an alkyl group, an alkoxyl group, a nitro group, a substituted sulfon group, a carbamoyl group which may have a substituent the nitrogen atom, sulfamoyl group, or a C-acylamino group, or a phthalimidyl group, any of which may have a substituent; $R_1$, $R_2$ may combinedly form a cyclic ring; and n represents an integer of 1-4.

2. The photosensitive member of claim 1, which essentially consists of a charge generating layer, a charge transporting layer and an electroconductive substrate wherein the charge generating layer contains the azo compound dissolved or dispersed in a binder.

3. The photosensitive member of claim 1, which essentially consists of a charge generating layer, a charge transporting layer and an electroconductive substrate wherein the charge generating layer contains the azo compound formed by deposition in vacuum.

4. The photosensitive member of claim 2, in which the thickness of the charge transporting layer is about 3-30 μm, and the thickness of the charge generating layer is not more than about 4 μm.

5. The photosensitive member of claim 1, which essentially consists of a photoconductive monolayer on an electroconductive substrate wherein the photoconductive monolayer contains the azo compound dissolved or dispersed in a binder.

6. The photosensitive member of claim 5, in which the azo compounds are contained at a proportion of 0.01-2 parts by weight as compared to one part by weight of the binder.

7. The photosensitive member of claim 5, in which the thickness of the photoconductive monolayer is about 3-30 μm.

* * * * *